(12) United States Patent
Lin

(10) Patent No.: US 6,677,941 B2
(45) Date of Patent: Jan. 13, 2004

(54) THREE-DIMENSIONAL RELATIVE POSITIONING AND TRACKING USING LDRI

(75) Inventor: Ching-Fang Lin, Simi Valley, CA (US)

(73) Assignee: American GNC Corporation, Simi Valley, CA (US)

(*) Notice: Subject to any disclaimer, the term of this patent is extended or adjusted under 35 U.S.C. 154(b) by 310 days.

(21) Appl. No.: 09/924,225

(22) Filed: Aug. 6, 2001

(65) Prior Publication Data
US 2002/0033818 A1 Mar. 21, 2002

Related U.S. Application Data

(60) Provisional application No. 60/223,556, filed on Aug. 5, 2000.

(51) Int. Cl.[7] .............................................. G06T 15/00
(52) U.S. Cl. .......................................... 345/419; 345/473
(58) Field of Search ................................. 345/419, 418, 345/473, 474, 475, 427, 426; 348/262; 356/601, 511, 619, 622, 621, 626

(56) References Cited

U.S. PATENT DOCUMENTS

| | | | | |
|---|---|---|---|---|
| 5,179,441 A | * | 1/1993 | Anderson et al. ............. 348/43 |
| 5,594,854 A | * | 1/1997 | Baldwin et al. ............. 345/441 |
| 6,081,621 A | * | 6/2000 | Ackner ........................ 382/216 |
| 6,347,156 B1 | * | 2/2002 | Kamada et al. ............. 382/237 |
| 6,377,265 B1 | * | 4/2002 | Bong .......................... 345/505 |

* cited by examiner

Primary Examiner—Kee M. Tung
Assistant Examiner—Huedung X. Cao
(74) Attorney, Agent, or Firm—Raymond Y. Chan; David and Raymond Patent Group (57) ABSTRACT

The present invention relates to a process and system for three-dimensional (3D) relative positioning and tracking, utilizing a range image and reflectance image producer including a laser dynamic range imager (LDRI), wherein a complete suite of unique 3D relative positioning and tracking algorithms and processing methods, including cross plane correlation, subpixel tracking, focal length determination, Kalman filtering, and orientation determination, is employed to take full advantage of the range information and reflectance information provided by the LDRI to provide relative position and orientation of a target to simultaneously provide the 3-D motion of multiple points of a target without the necessity of using multiple cameras and specific targets and the relative attitude of the target with respect to a carrier of the LDRI.

26 Claims, 9 Drawing Sheets

THREE-DIMENSIONAL RELATIVE POSITIONING AND TRACKING USING LDRI

CROSS REFERENCE OF RELATED APPLICATION

This is a regular application of a provisional application having an application No. 60/223,556, and a filing date of Aug. 5, 2000.

The present invention is made with Government support under Contract DAAH01-00-C-R013 awarded by the Defense Advanced Research Projects Agency (DARPA), Tactical technologies Office, 3701 North Fairfax Drive, Arlington, Va. 22203-1714. The Government has certain rights in this invention.

BACKGROUND OF THE PRESENT INVENTION

1. Field of the Present Invention

The present invention relates to a relative positioning and tracking process, and more particularly to a process and system for three-dimensional (3D) relative positioning and tracking, utilizing a range image and reflectance image producer, including a laser dynamic range imager (LDRI), wherein a complete suite of unique 3D relative positioning and tracking algorithms and processing methods, including cross plane correlation, subpixel tracking, focal length determination, Kalman filtering, and orientation determination, is employed to take full advantage of the range and reflectance information provided by LDRI to provide relative position and orientation of a target with respect to the LDRI's carrier.

2. Description of Related Arts

Relative positioning and tracking are critical in some applications involving structural-dynamic measurements, automated navigation, tracking of projectiles, munition guidance, collision avoidance, surveillance of military subjects, target recognition, metrology, robotic vision, and highly accurate automated docking of unmanned micro shuttles to the docking module of satellites in orbit.

The Laser Dynamic Range Imager (LDRI) was developed by the Sandia National Laboratories to take care of the illumination problem by using a continuous wave (cw) laser radar to illuminate the scene. An LDRI unit is able to provide the reflectance imagery and range imagery simultaneously, with a pixel-by-pixel corresponding relationship.

The LDRI is a known technology as illustrated in the following references:

(A) Lin, C. F., *Modern Navigation, Guidance, and Control Processing.* Englewood Cliffs, N.J., Prentice-Hall, 1990.
(B) Lin, C. F., *Advanced Control System Design.* Englewood Cliffs, N.J., Prentice-Hall, 1993.
(C) Pecina, Jose N., Mike Snyder, Clyde Sapp, Kevin Crosby, Vincent Elliott, Premkumar Saganti, Greg Byrne, and Mike Gaunce, "Dynamic of the solar array motion: an image analysis approach," 1998 *SEM Spring Conference on Experimental and Applied Mechanics*, Houston, Tex. Jun. 1–3, 1998.
(D) James, George, III, David Zimmerman, Mike Grygier, George Studor, Jose N. Pecina, Robert Nellums, "Development of non-contact sensors and data analysis tools for ISS structural dynamics," *AIAA* 1999 *Annual Technical Symposium. Developing Space Operations, Technology, & Utilization,* Houston, Tex. May, 27–31.
(E) Press, W. H., S. A. Teukosky, W. T. Vetterling, and B. P. Flannery. *Numerical Recipes in C: The art of Scientific Computing*, Second Edition. Cambridge University Press, 1992.
(F) Studor, George, "Laser Dynamic Range Imager Space Shuttle Flight Demonstration," NASA JSC, Houston, Tex. 77058, Structural Mechanics Report, 1998.
(G) Gelb, A. *Applied Optimal Estimation.* The MIT Press, 1974.
(H) Bierman, G. J. *Factorization Methods for Discrete Sequential Estimation.* Academic Press, 1977.
(I) Park, P., and T. Kailath. "New square root algorithms for Kalman filtering," *IEEE Trans. Automatic Control*, Vol. 40, No. 5, pp. 895–899, 1995.
(J) Golub, G. H., and C. F. Van Loan. *Matrix Computations.* Johns Hopkins University Press, 1983.
(K) Schmitt, R. L., R. J. Williams, and J. D. Matthews, "High frequency scannerless imaging laser radar for industrial inspection and measurement applications," *Sandia Report*, SAND96-2739, UC-906, 1996.

The Laser Dynamic Range Imager (LDRI) is a dynamic version of the Scannerless Range Imager (SRI) and the Point Tracking (PT) algorithm. The SRI provides the range measurement from the laser unit to the field of view for far or near inspection distances, but it functions only on statics scenes. The Point Tracking (PT) software package provides the cross-plane time history motion, while a dynamic adaptation of the SRI generates the range measurements from the laser unit to the field of view. The advantage of the LDRI over the conventional photogrammetric methods resides in the feasibility in obtaining, simultaneously, the 3-D motion of multiple points without the necessity of using multiple cameras and specific targets. The resolution of the position of a point is dramatically improved, and the elimination of special illuminating conditions in the scene are unnecessary. Commercial applications exist in flight vehicle docking automated navigation, flight refueling, precision materials fabrication, collision avoidance, and modal analysis.

It's still challenging to provide a processing method for the LDRI to realize the potential advantages of the LDRI.

SUMMARY OF THE PRESENT INVENTION

A main objective of the present invention is to provide a three-dimensional (3D) relative positioning and tracking process utilizing the laser dynamic range imager (LDRI), wherein the reflectance imagery and range imagery are processed to simultaneously obtain the 3-D motion of multiple points of a target without the necessity of using multiple cameras and specific targets.

Another objective of the present invention is to provide a three-dimensional (3D) relative positioning and tracking process utilizing the laser dynamic range imager (LDRI), wherein the reflectance imagery and range imagery are further processed to obtain the relative attitude of the target with respect to the LDRI's carrier.

Another objective of the present invention is to provide a three-dimensional (3D) relative positioning and tracking process utilizing the laser dynamic range imager (LDRI), wherein a practical focal length determination algorithm is disclosed for the Laser Dynamic Range Imager (LDRI) imagery, which does not require any control points. Focal length determination enables the translation of each pixel in the LDRI range imagery into the world coordinates in Cartesian representation.

Another objective of the present invention is to provide a three-dimensional (3D) relative positioning and tracking process utilizing the laser dynamic range imager (LDRI), wherein the world coordinates in Cartesian representation of the imagery enables to carry out orientation determination, which in turn aids the point tracking to project the trajectory in the world coordinate system. This provides a means to aid the intensity image processing by the range image processing, which is otherwise impossible without the utilization of the LDRI images.

DETAIL DESCRIPTION OF THE PREFERRED EMBODIMENT

Referring to FIGS. 1 to 9, a three-dimensional (3D) relative positioning and tracking process utilizing the laser dynamic range imager (LDRI) is illustrated, wherein the reflectance imagery and range imagery are processed to simultaneously obtain the 3-D motion of multiple points of a target without the necessity of using multiple cameras and specific targets.

Figure 9:
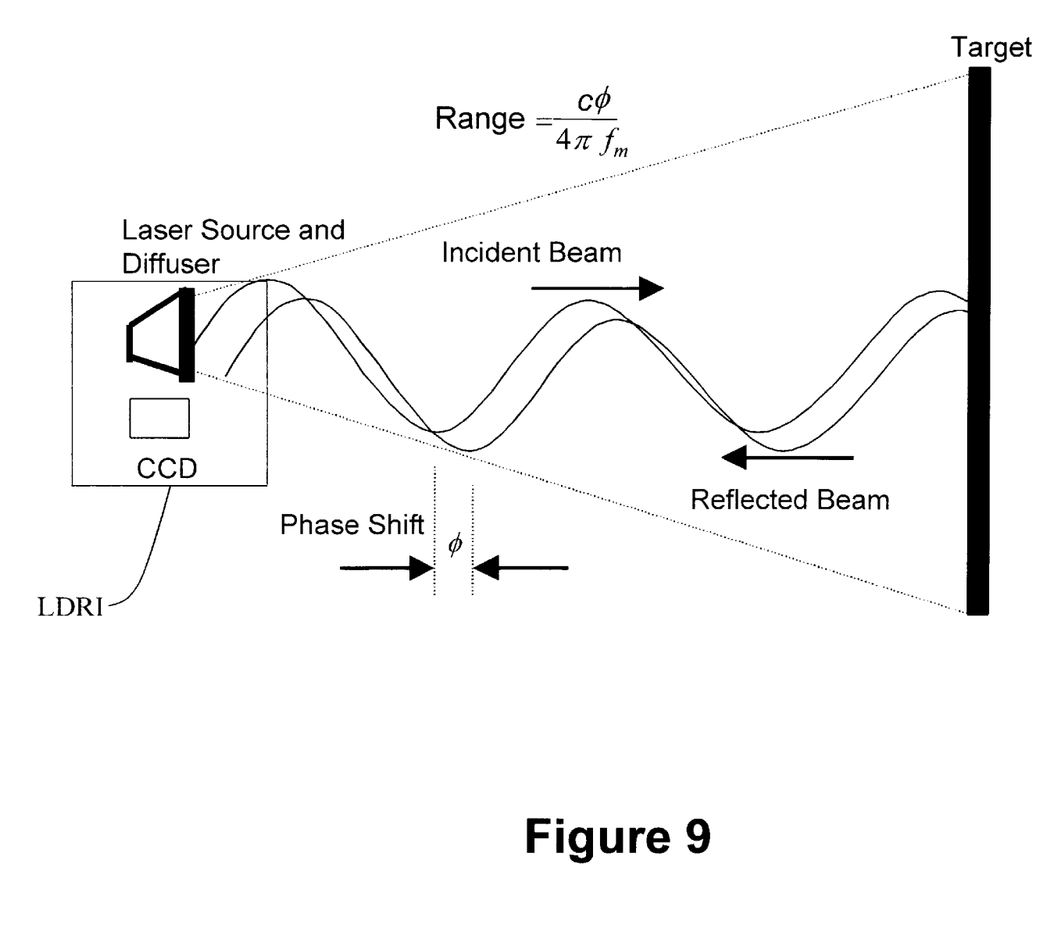
FIG. 9 shows the Conceptual Graphical Principle for a LDRI.

As shown in FIG. 9, it is a known art that operation of the Laser Dynamic Range Imager relies on measurements of the phase difference between an intensity-modulated probe laser beam that has been initially diffused over the field of view, and its reflected beam from the target. In a Laser Dynamic Rang Imager (LDRI), a laser diode is intensity modulated at a given frequency $f_m$. This laser illuminates the entire field of view of the scene of interest. Light is collected by a lens from the scene onto an image intensifier tube and then transmitted to a Charge Coupled Device (CCD) camera.

The LDRI generates two kinds of imagery, namely a range imagery and a reflectance imagery. Reflectance imagery is a digital image obtained directly from the scene. The phase shift for a range image can be determined from the reflectance image. The intensity at each pixel of each reflectance image satisfies the following equation:

$$I = A + B \cos(\phi + \delta) \quad (1)$$

where I is the intensity pixel values of the reflectance image; A is a constant offset proportional to the illumination intensity, $1/R^2$, the object albedo, and the optical receiver gain; B is a constant that defines a depth of modulation; $\phi$ is the phase shift to the pixel in the scene; and $\delta$ is an electronic phase shift between the transmitted and received signals.

Assume a series of N reflectance images with phase shifts $\delta_i$ between the transmitter and receiver known. The intensity of a pixel in the i-th reflectance image can be written as:

$$I_i = A + B \cos(\phi + \delta_i) = a_0 + a_1 \cos \delta_i + a_2 \sin \delta_i \quad (2)$$

where $$a_0 = A$$

$$a_1 = B \cos \phi \quad (3)$$

$$a_2 = -B \sin \phi$$

From equation (2), at least three reflectance images are necessary to construct a range image, by executing a least-squares-fit algorithm. In fact, the intensity is modulated to generate at least 3 different intensity images of the same field of view. When $N \geq 3$, a least-squares-fit algorithm can provide a least-squares solution to the unknowns $a_0$, $a_1$, and $a_2$. Once $a_0$, $a_1$, and $a_2$ are known, the phase shift to the scene pixel is calculated by:

$$\phi = \arctan(-a_2/a_1) \quad (4)$$

In Equation (3), the arctan function returns a value of $\phi$ between $-\pi/2$ and $\pi/2$. It is possible, however, to determine the value of $\phi$ over a full range of $[0, 2\pi]$, since we know the value of $\sin \phi$ and $\cos \phi$. Nevertheless, an ambiguity in the range could be present for phase shifts $\phi \geq 2\pi$. Using a laser continuous wave radar range finder can solve this problem.

This phase shift to each pixel, $\phi$, is proportional to the distance between the laser unit and the target pixel. This distance is given by the range equation:

$$R = \frac{c\phi}{4\pi f_m} \quad (5)$$

In this equation, c is the speed of light, $\phi$ is the phase shift between the incident and reflected laser beams, and $f_m$ is the frequency at which the intensity of the laser diode was modulated. The laser source and the image intensifier are synchronously modulated at the same frequency to produce, in both, a sinusoidal variation in the scene illumination intensity. By integrating and storing the output of the image intensifier on a CCD camera based receiver, an image containing the phase shift information for each pixel in the scene is constructed. This image contains information about the range values, and it is called the range image.

The range resolution is a function of the modulation frequency, and the signal-to-noise-ratio (SNR) of the data. The range resolution for the LDRI is given by:

$$\delta R = \frac{c}{4\pi f_m \sqrt{2} \, (SNR)} \quad (6)$$

Changing the focal length can modify the LDRI field-of-view. However, to improve the range resolution, it is necessary to increase the modulation frequency, $f_m$, or to increase the signal-to-noise ratio of the data.

Typically, the sizes of the reflectance image and range image from a LDRI are both 640×480 pixels. In digital format, each pixel of the reflectance image is stored in a 1-byte integer, while each pixel of the range image is stored in a 4-byte float-pointing number.

Therefore, the size of a reflectance image is:
ti Reflectance image size: 640×480=307,200 bytes The size of a range image is:

Range image size: 640×480×4=1,228,800 bytes

An LDRI unit is able to generate 30 frames of reflectance images in one second. Assume that 4 frames of reflectance images are used to generate 1 frame of a range image. A one-minute LDRI operation collects:
Reflectance Image Data in 1 minute:

60×7.5×4×307,200=552,960,000 bytes=540 Mb and Range Image Data in 1 minute:

60×7.5×1,228,800=552,960,000 bytes=540 Mb

Such a huge amount of data, very effective tracking process, algorithms, and very efficient algorithm implementation must be invented for extraction of relative position, velocity, and attitude of multi points of the target to meet requirements of some applications.

Figure 1:
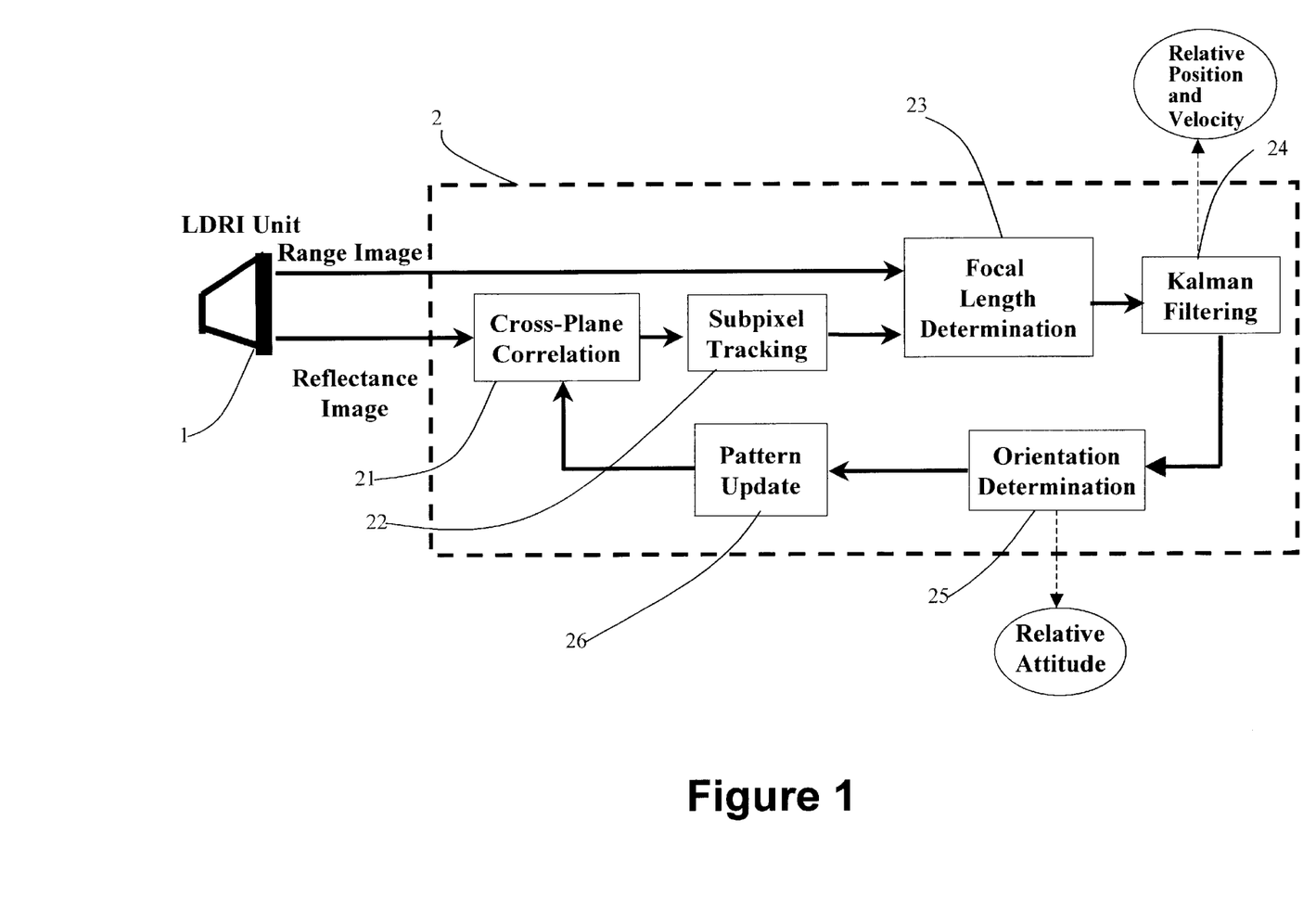
FIG. 1 is a block diagram illustrating the relationship and processing flow among the various modules of the 3D relative positioning and tracking process, which includes cross-plane correlation, subpixel tracking, focal length determination, Kalman filtering, and orientation determination according to the preferred embodiment of the present invention.

Referring to FIG. 1, a three-dimensional relative positioning and tracking process 2 utilizing the laser dynamic range imager (LDRI) of the present invention is achieved by means of a cross-plane correlation module 21, a subpixel tracking module 22, a focal length determination module 23, a Kalman filter module 24, a orientation determination module 26, and a pattern update module 27. Obviously, the process of the present invention can be applied for any range image and reflectance image producer, including a laser dynamic range imager (LDRI), which can produce range images and reflectance images of a target.

Referring to FIG. 1, the three-dimensional relative positioning and tracking process 2 of the present invention, utilizing a range image and reflectance image producer, such as a laser dynamic range imager (LDRI), comprises the steps of:

(1) pinpointing points of interest in an image of a target with pixel accuracy;

(2) obtaining a subpixel resolution by means of a numerical interpolation in a neighborhood of a pixel with a maximum correlation of the points of interest;

(3) determining a focal length of lens of the range image and reflectance image producer;

(4) computing 3-dimensional positions of the points of interest of the target with respect to a carrier of the LDRI; and (5) determining a relative attitude of the target with respect to the carrier from three selected 3-dimensional positions of the 3-dimensional positions of the target.

When the target is moving, the size and orientation of the pattern change accordingly. Therefore, the pattern should be updated during tracking, in order to keep track of the pattern. A few approaches are possible to update the pattern.

Therefore, after the step (5), the three-dimensional relative positioning and tracking process 2 of the present invention further comprises an additional step of:

(6) updating the points of interest in the step (1) by using the 3-dimensional positions obtained in the step (4) and the relative attitude of the target obtained in the step (5).

The following embodiment details the 3D relative positioning and tracking algorithms to take full advantage of the range and reflectance information provided by the LDRI, which includes cross-plane correlation, subpixel tracking, focal length determination, Kalman filtering, and orientation determination, referring to FIG. 1.

For the preferred embodiment of the present invention, the following two coordinate systems are involved:

(A) Pseudo-spherical coordinate system.

(B) World Cartesian coordinate system.

For image processing and orientation determination purposes, it is preferable to work in a world Cartesian (x, y, z) coordinate system. The images produced by the LDRI, however, can be best described in a pseudo-spherical coordinate system (i, j, R), which is detailed below. Therefore, a transformation from the LDRI pseudo-spherical coordinate system into the Cartesian coordinate system must be established.

Figure 7:
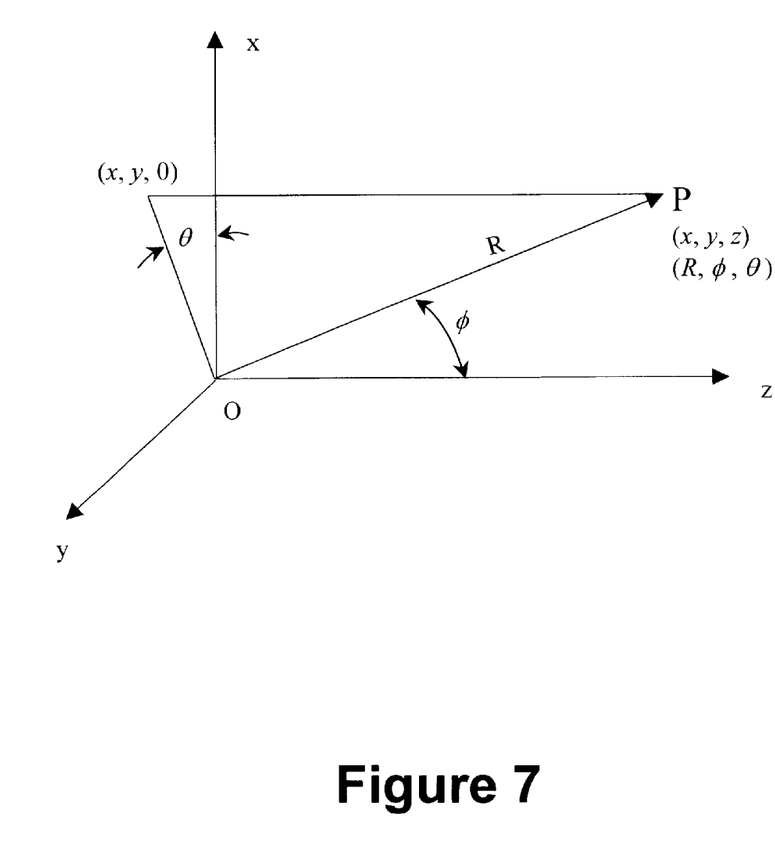
FIG. 7 shows the Cartesian Coordinate System and Standard Spherical Coordinate System.

Before the pseudo-spherical coordinate system is described in more detail, the relationship between a standard spherical coordinate system and the Cartesian coordinate system, as shown in FIG. 7, is summarized. A point in space, P, which has Cartesian coordinates (x, y, z), can be represented in a spherical coordinate system by spherical coordinates $(R, \phi, \theta)$, $$R = \sqrt{x^2 + y^2 + z^2} \quad (7)$$
$$\phi = \arccos\left(\frac{z}{\sqrt{x^2 + y^2 + z^2}}\right)$$
$$\theta = \arctan\left(\frac{y}{x}\right)$$

where R is the distance from the origin O to the point P, $\phi$ is the angle between the z axis and the line segment OP, and $\theta$ is the angle between the x axis and the projection of OP onto the x-y plane. Inversely, the transformation from spherical coordinates $(R, \phi, \theta)$ to Cartesian coordinates (x, y, z) is:

$x = R \cos \theta \sin \phi$ $y = R \sin \theta \sin \phi$ \quad (8)

$z = R \cos \phi$

Figure 8:
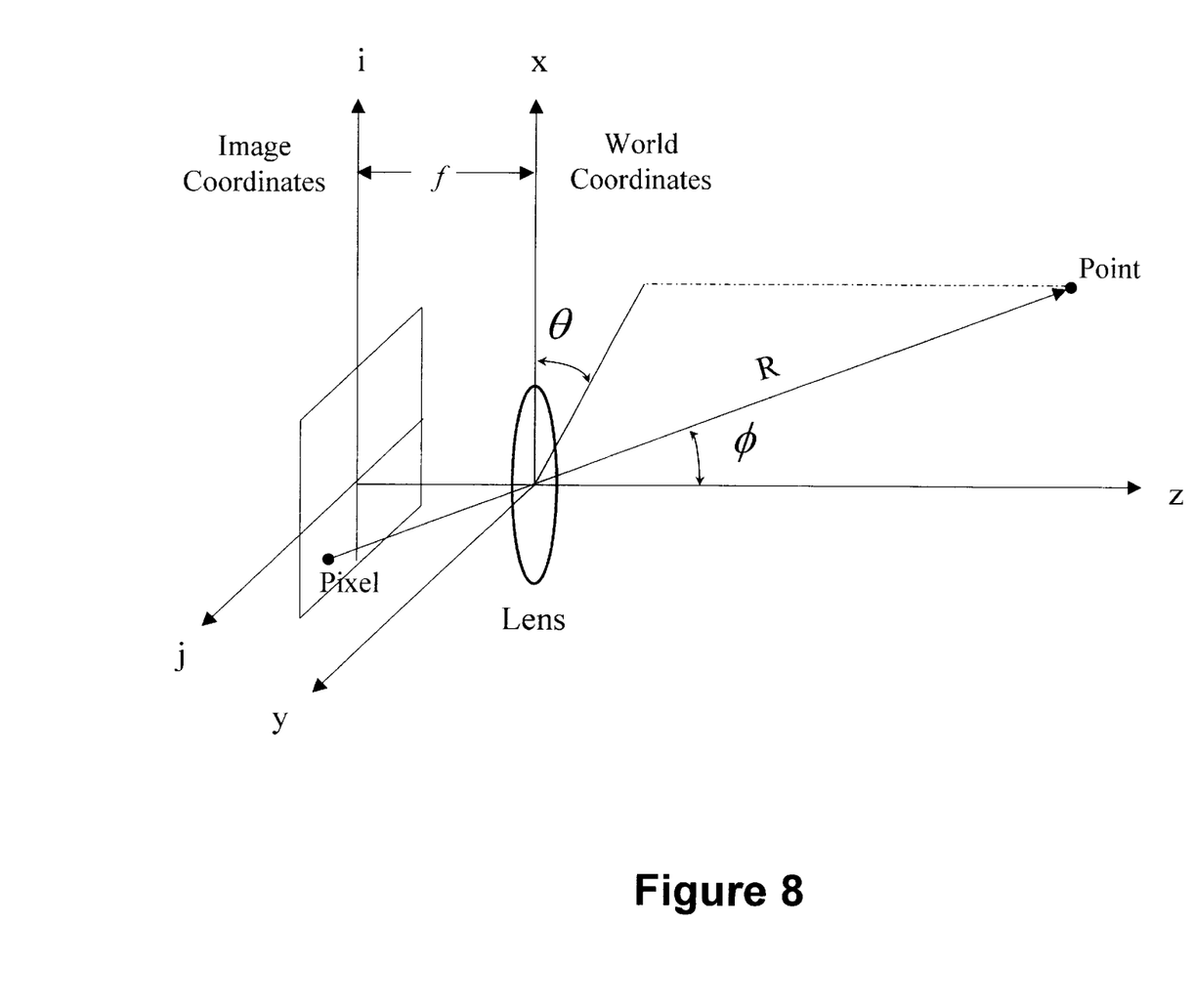
FIG. 8 shows the LDRI Pseudo-Spherical Coordinate System.

In the LDRI imagery, object points are imaged on a photosensitive array detector, i.e., the photo-cathode of an image intensifier, by a lens. For simplicity, the origin of the Cartesian coordinate system is positioned at the LDRI lens, as shown in FIG. 8. The point P is imaged onto the photocathode of the LDRI. Tracing the optical ray that goes through the center of the lens, the angles $\phi$ and $\theta$ remain the same for the image as those for the object. This can be deduced from the geometric relations in FIG. 8. Based upon the fact that the image plane is located one focal length away from the lens, the z coordinate of the image point is fixed at z=f for all object points, where f is the focal length of the lens.

Define the pseudo-spherical coordinate system (i, j, R) for the LDRI, where i is the vertical coordinate of the pixel in the image plane, j is the horizontal coordinate of the pixel in the image plane, and R is the range to the scene pixel.

The units of i and j are those of the image plane, the photocathode of an image intensifier tube. If each pixel in the CCD is spaced 16 µm apart and a 3:1 fiber optic taper is used to couple the CCD into the image intensifier tube, each i or j increment is 48 µm.

The units of i and j, however, become irrelevant, if we select the unit of the lens focal length the same as those of i and j. This fact is important and must be kept in mind in the following focal length determination application.

The relationship between the pseudo-spherical coordinates (i, j, R) and the spherical coordinates (R, φ, θ) is:

$$R = R \quad (9)$$

$$\phi = \arccos\left(\frac{f}{\sqrt{i^2 + j^2 + f^2}}\right)$$

$$\theta = \arctan\left(\frac{j}{i}\right)$$

where f is the focal length of the lens used to image the scene onto the photocathode of the image intensifier tube.

It can be calculated that $$\sin\phi = \frac{\sqrt{i^2 + j^2}}{\sqrt{i^2 + j^2 + f^2}} \quad (10)$$

$$\cos\phi = \frac{f}{\sqrt{i^2 + j^2 + f^2}}$$

$$\sin\theta = \frac{j}{\sqrt{i^2 + j^2}}$$

$$\cos\theta = \frac{i}{\sqrt{i^2 + j^2}}$$

The transformation from the LDRI pseudo-spherical coordinates (i, j, R) to the Cartesian coordinates (x, y, z) is established as:

$$x = R \frac{i}{\sqrt{i^2 + j^2 + f^2}} \quad (11)$$

$$y = R \frac{j}{\sqrt{i^2 + j^2 + f^2}}$$

$$z = R \frac{f}{\sqrt{i^2 + j^2 + f^2}}$$

Similarly, the transformation from the Cartesian coordinates (x, y, z) to the LDRI pseudo-spherical coordinates (i, j, R) is:

$$i = f \frac{x}{z} \quad (12)$$

$$j = f \frac{y}{z}$$

$$R = \sqrt{x^2 + y^2 + z^2}$$

For the purpose of 3D tracking, at least three points of interest are to be tracked continuously in consecutive frames. A pixel in the reflectance image, however, does not provide enough information for tracking. Therefore, referring to FIG. 2, a pattern which includes the pixel of interest, is usually selected and located in every frame. Once the pattern is located, the pixel of interest is located as well.

In order to reduce computation, the size of the pattern is usually chosen to be much smaller than the size of the image. Since the cross-plane correlation measures the degree of similarity of two images with the same size, cross-plane correlation is performed at various amounts of shifting of the entire image relative to the pattern. Maximum correlation occurs at the x-y shift where the two images are most similar. A normalized cross-correlation is used, in order to prevent loss of track due to uniform changes in illumination.

Figure 2:
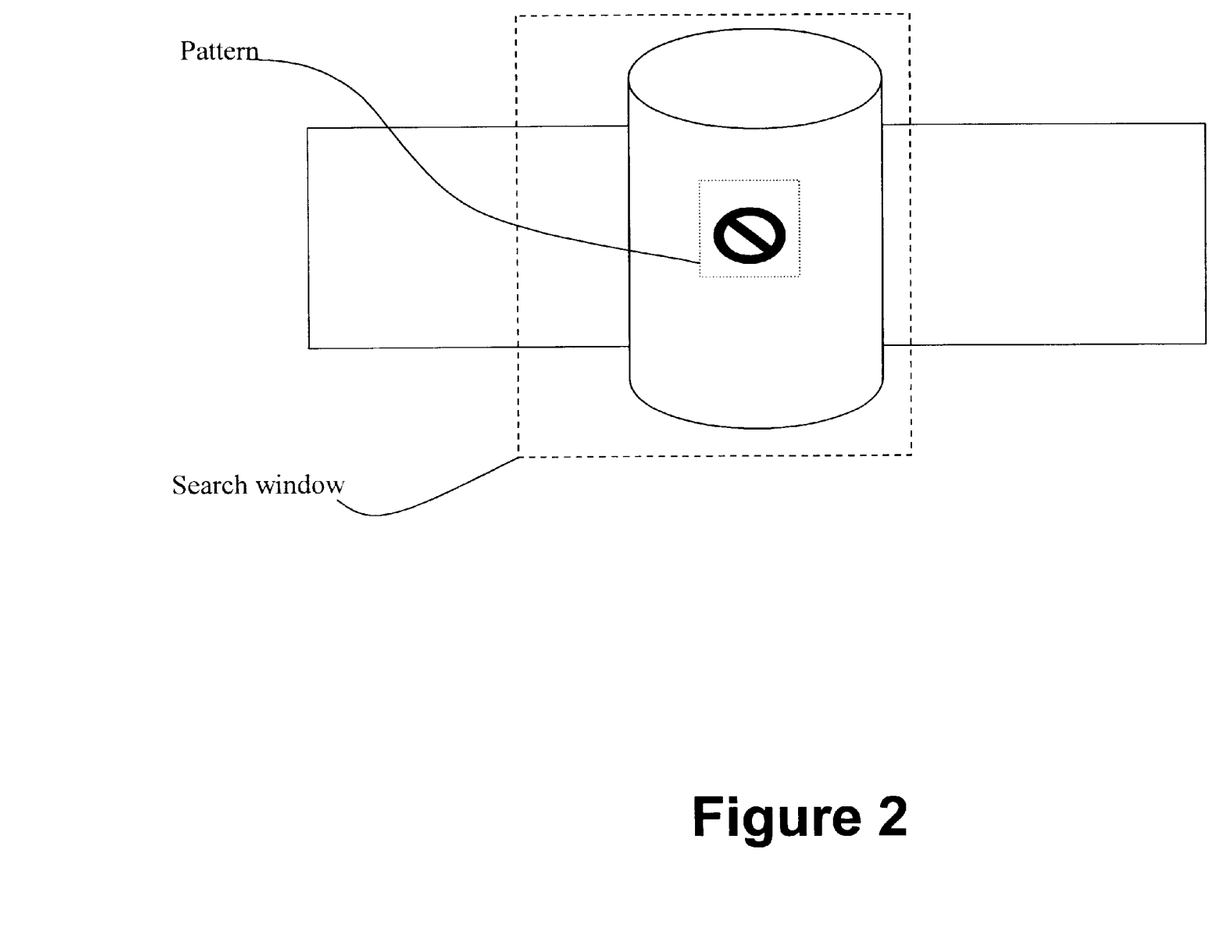
FIG. 2 is a graphical illustration showing the selection of the pattern of interest and the surrounding search window.
Figure 3:
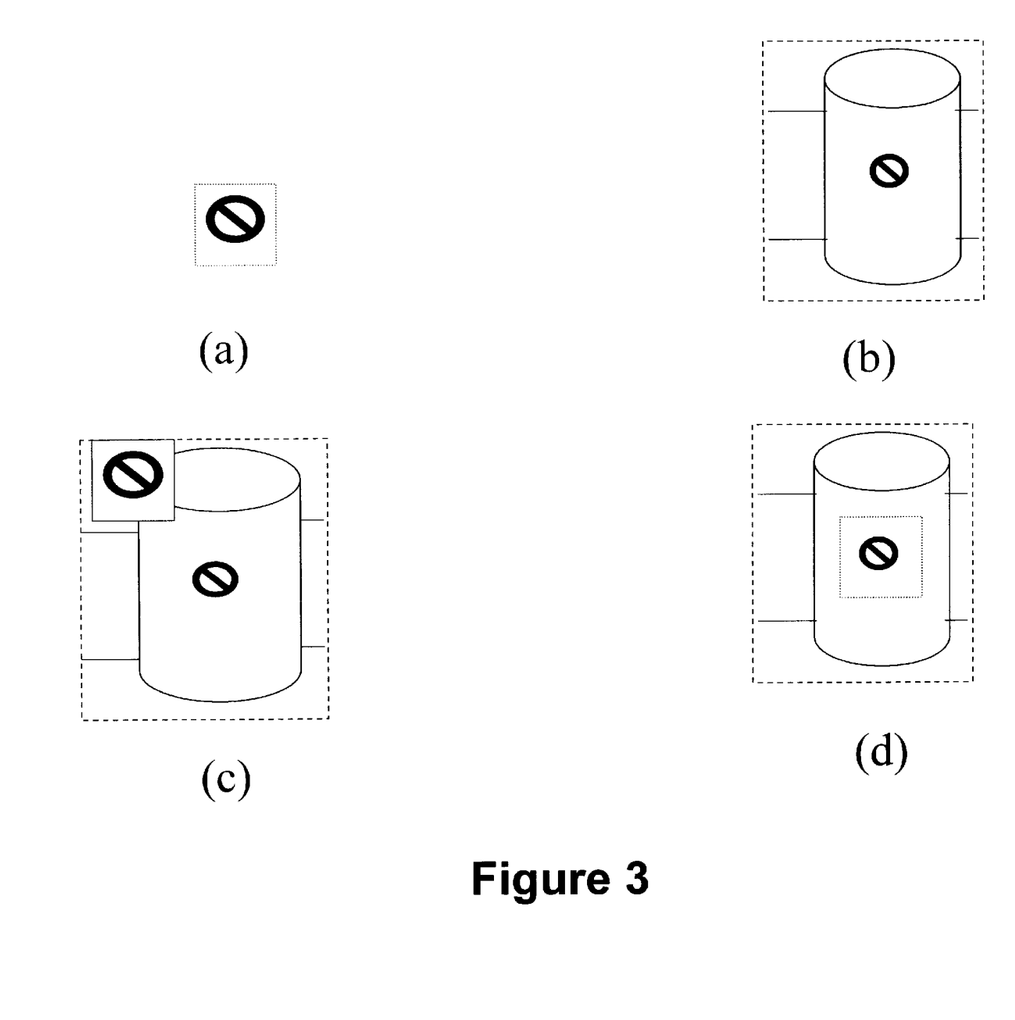
FIG. 3 is a graphical illustration showing the procedures of the cross-plane correlation process.

Usually, it is not necessary to shift over the entire image to do the cross-plane correlation. A search window can be selected in the image, and cross-plane correlation is performed against the search window instead of the entire image. This reduces the computation, depending on the size of the search window. FIGS. 2 and 3 illustrate this idea.

Referring to FIG. 3, the step (1) further comprises the steps of:
(1.1) defining a pattern to be tracked;
(1.2) selecting a search window containing the pattern;
(1.3) passing the pattern over the search window and computing a cross-correlation; and
(1.4) determining the 3-dimensional positions of the points of interest of the search window that match with the pattern when the cross-correlation takes a highest value thereof at a pixel position.

As a preferred embodiment, the step (1.1) is performed through a database of specific patterns. The database of specific patterns extracted from a target, such as a resupply satellite, is selected for pattern recognition and selection. This database will provide an artificial intelligence and decision aid in the selection of a docking trajectory. This procedure provides a smart determination of the relative orientation and position of the target, such as a resupply and mother satellites.

The most computation-intensive portion in the multiple point tracking algorithms is the cross-plane correlation. If the cross-plane correlation algorithm can be optimized, the speed of the software can be improved significantly. We have developed an optimized cross-plane correlation algorithm to reduce the computation.

As shown below, when passing the pattern a(x, y) over the search window, the pattern remains unchanged, while the subset of the search window b(x, y) is changing.

$$Crosscorr(k, l) = \frac{\sum_{xy}(a(x+k, y+l) - \overline{a(x+k, y+l)})(b(x, y) - \overline{b})}{\left[\sum_{xy}(a(x+k, y+l) - \overline{a(x+k, y+l)})^2 \sum_{xy}(b(x, y) - \overline{b})^2\right]^{1/2}}$$

Therefore, for each frame, the mean of the b(x, y), $\overline{b}$, needs to be computed only once. Furthermore, the term in the denominator, $$\sum_{xy}(b(x, y) - \overline{b})^2,$$

also needs to be computed only once and saved for later use. This reduces the computation by one third.

Pixel resolution can be gained by finding the maximum of the cross plane correlation function. However, by considering other pixels in the neighborhood of the pixel with the maximum correlation, much higher resolution, i.e., subpixel resolution, can be obtained from the correlation function. The key idea to obtain subpixel resolution is to use numerical interpolation in the neighborhood of the pixel with the maximum correlation.

Figure 6:
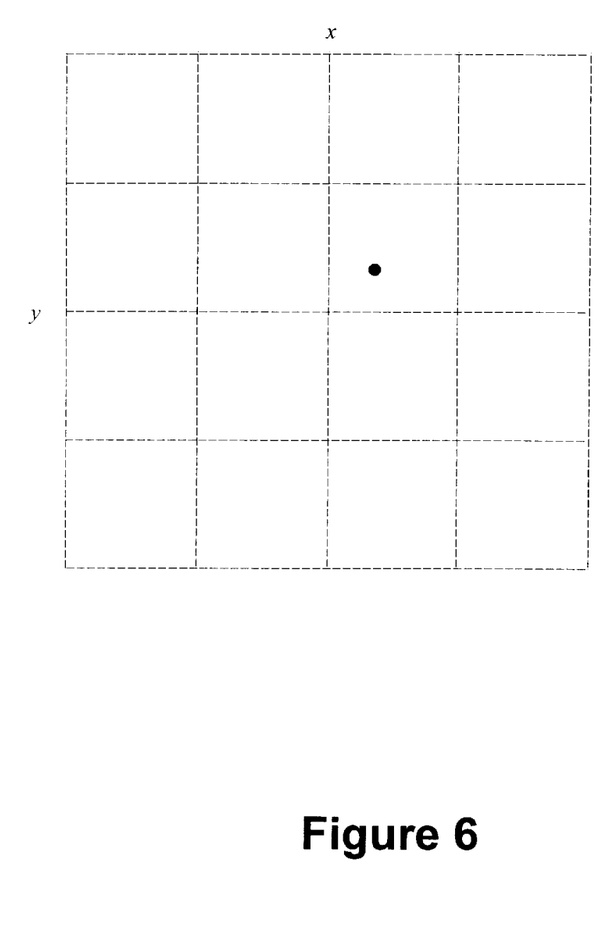
FIG. 6 is a graphical illustration showing the procedure of finding the range at a subpixel level.

Both the LDRI reflectance and range images provide the target information at the pixel level. Using the subpixel tracking algorithm, the position of the point of interest can be determined at the subpixel level. However, no range data corresponding to a subpixel is available. The step (2) uses a cubic spline interpolation algorithm to extract subpixel range data.

The idea is straightforward. Referring to FIG. 6, once the subpixel position is determined, we first select the closest pixel to that subpixel. Centered at this pixel, a few more points are taken in each direction (left, right, up, and down), thus forming a mesh matrix. Then, a standard 2D cubic spline interpolation is performed, to find out the subpixel range corresponding to the original subpixel position.

Figure 4:
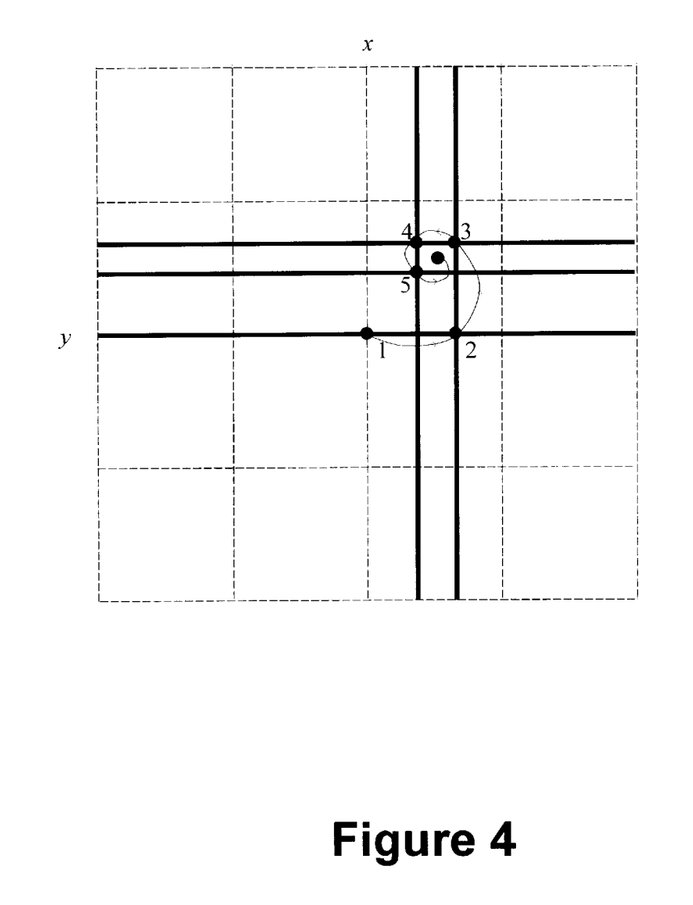
FIG. 4 is a graphical illustration showing the process of finding out the maximum of a 2D cubic spline interpolation function.

Referring to FIG. 4, an effective and efficient algorithm for subpixel tracking is shown. Based on an analytical algorithm to find the peak of a 1D cubic spline interpolation function, this algorithm does not require evaluating the 2D spline function every, say, 0.01 pixel. The 1D cubic spline interpolation function is a piecewise 3-order polynomial function, and the derivative of the 1D cubic spline interpolation function is a piecewise quadratic polynomial function. The peak of the 1D cubic spline interpolation function at each interval can be found either at either end of the interval, or at the zero of its derivative. The zero of the derivative, a quadratic equation, can be found analytically. When the peak of the 1D cubic spline interpolation function at each interval is found, its peak over the entire range can be selected among them. This constitutes a feasible solution to the maximum of a 1D cubic spline interpolation function.

To find the maximum of a 2D cubic spline interpolation function, we start with the maximization of the 1D cubic spline interpolation function along the row which passes through the center point 1. The maximum of this 1D cubic spline interpolation function is found to be at Point 2. Then we find the maximum of the 1D cubic spline interpolation function along the column which passes Point 2, which leads to Point 3. Next, we find the maximum of the 1D cubic spline interpolation function along the row which passes Point 3, which leads to Point 4. Next, we find the maximum of the 1D cubic spline interpolation function along the column which passes Point 4, which leads to Point 5. This process continues until we get a convergent point, which is the final solution to the maximum of a 2D cubic spline interpolation function.

The focal length is a parameter necessary in the transformations between the LDRI pseudo-spherical coordinate system and the Cartesian world system. The LDRI system provides a range image where the magnitude of this distance from the laser aperture to the point tracked is given at each pixel in the scene. The focal length is changing with the motion of the tracked object. Different distances from the camera to the field-of-view need focal length adjustments for obtaining a well-defined image. The determination of the camera focal length is, however, not a trivial problem. A practical focal length determination algorithm, which does not require any control points, is disclosed.

From an LDRI image, the pseudo-spherical coordinates (i, j, R) can be easily obtained for each pixel. Provided that for an LDRI image, the focal length of the camera is known, the pseudo-spherical coordinates can be readily transformed into the Cartesian coordinates. Assume that the pseudo-spherical coordinates for two pixels $P_1$ and $P_2$ are known, i.e., ($i_1$, $j_1$, $R_1$) and ($i_2$, $j_2$, $R_2$), respectively. Also, the distance between these two points in the Cartesian coordinate system is known, wherein these two points correspond to these two pixels, D. Denote the focal length of the camera for this image by f. Based upon the pseudo-spherical coordinates and the distance between these two points, we can construct an equation which contains only one unknown variable, f, as follows:

$$\left(R_2 \frac{i_2}{\sqrt{i_2^2 + j_2^2 + f^2}} - R_1 \frac{i_1}{\sqrt{i_1^2 + j_1^2 + f^2}}\right)^2 +$$
$$\left(R_2 \frac{j_2}{\sqrt{i_2^2 + j_2^2 + f^2}} - R_1 \frac{j_1}{\sqrt{i_1^2 + j_1^2 + f^2}}\right)^2 +$$
$$\left(R_2 \frac{f}{\sqrt{i_2^2 + j_2^2 + f^2}} - R_1 \frac{f}{\sqrt{i_1^2 + j_1^2 + f^2}}\right)^2 - D^2 = 0$$

The equation constructed in this way contains only one unknown variable, f. Solving this equation leads to the determination of the focal length.

A close inspection of the constructed equation reveals that it is essentially a quadratic polynomial equation for $f^2$. Therefore, an analytical solution for $f^2$ can be established for this equation. Once $f^2$ is known, the focal length f can be determined as well.

Expanding the constructed Equation simplifies it to the following form:

$$\frac{i_1 i_2 + j_1 j_2 + f^2}{\sqrt{i_1^2 + j_1^2 + f^2} \sqrt{i_2^2 + j_2^2 + f^2}} = \frac{R_1^2 + R_2^2 - D^2}{2 R_1 R_2}$$

Name $x = f^2$, and denote $$\begin{cases} a = \frac{R_1^2 + R_2^2 - D^2}{2 R_1 R_2} \\ b = i_1 i_2 + j_1 j_2 \\ c = i_1^2 + j_1^2 \\ d = i_2^2 + j_2^2 \end{cases}$$

The Equation can be reformulated into:

$$(a^2-1)x^2 + (a^2c + a^2d - 2b)x + (a^2cd - b^2) = 0$$

The above Equation is a quadratic polynomial equation for x, from which two solutions for x can be obtained analytically. Since $x = f^2$, the focal length f can be determined once x is known.

To obtain a more accurate focal length, more equations can be established for more than two points, if the distances among them are known. An average of the solutions may provide a better solution to the focal length.

For image processing and orientation determination purposes, it is preferable to work in a world Cartesian (x, y, z) coordinate system. The images produced by the LDRI, however, can be best described in a pseudo-spherical coordinate system (i, j, R). Therefore, a transformation from the LDRI pseudo-spherical coordinate system into the Cartesian coordinate system must be established. Based on the optical geometry, the mutual transformations between the LDRI pseudo-spherical coordinate system and the Cartesian world system have been developed, with the focal length of the lens as an intermediate variable.

LDRI imagery and image processing technologies allow for tracking in the 3-dimensional world coordinate frame. Kalman filtering techniques can thus be utilized to improve the tracking accuracy. Kalman filtering is a model-based estimation technique. By modeling the relative motion with an appropriate acceleration model, the Kalman filtering techniques is ideally suited for 3D tracking purposes.

The benefits of introducing a Kalman filter into LDRI tracking, which is formulated in the 3D world coordinates, lie in two aspects. First, Kalman filtering and smoothing improve tracking accuracy based on motion dynamics formulation, which makes subpixel accuracy feasible. Second, the Kalman filter can be used to predict the 3D world coordinates of a point of interest in the next frame from the current 3D world coordinates. Such a prediction can be used to determine the center and size of search window for the Point Tracking algorithm.

The latter is very important for the point tracking algorithms. Proper location and size of the search window are crucial for a successful tracking of a point of interest. An incorrect location or too small a size of the search window will definitely lead to loss of track. If the search window is chosen too large, more computation is needed to carry out the cross plane correlation. By incorporating the target 3D world position into the Kalman filter states, the state estimate can be used to determine the center of the search window in the image pseudo-spherical coordinates, and the state estimate covariance matrix can be used to determine the size of the search window in the image coordinates.

The system model of the tracked target characterizes the motion dynamics. It can be naturally described in a continuous-time form, using the dynamic relationship among the position, the velocity, and the acceleration in the world 3D coordinate frame. In the case that the measurements are available at equally spaced time intervals, the dynamic equation can be discretized in advance and be formulated in an equivalent discrete-time form.

The motion dynamics of the tracked target is described in the continuous-time form:

ti $\dot{x}(t)=Fx(t)+w(t)$ where x(t) is the state vector, F is the system matrix, and w(t) is the system noise with a covariance matrix Q(t). In our application, x(t) is a 9-dimensional vector which consists of the 3D target position, the velocity, and the acceleration, and F is a 9×9 matrix. Specifically, $$x = \begin{pmatrix} x \\ y \\ z \\ v_x \\ v_y \\ v_z \\ a_x \\ a_y \\ a_z \end{pmatrix}, F = \begin{pmatrix} 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{pmatrix}$$

where x, y, z are 3D coordinates, respectively, $v_x$, $v_y$, $v_z$ are the 3D velocities, respectively, and $a_x$, $a_y$, $a_z$ are the 3D accelerations respectively. In above, a Markovian model is used for the acceleration, which is suitable for the slow relative movement between the mother satellite and the resupply satellite.

The measurement equations can be established based upon different considerations. One choice is to use the pseudo-spherical coordinates of the tracked target, (i, j, R), which are related to the position in the 3D world coordinate frame in the following:

$$i = f\frac{x}{z}$$
$$j = f\frac{y}{z}$$
$$R = \sqrt{x^2 + y^2 + z^2}$$

Note that Kalman filtering is executed after the focal length is determined, referring to FIG. 1. Therefore, in Equation above, f is known, and the relationship between (i, j, R) and (x, y, z) is fully determined. Also it should be noted that the measurement equation is nonlinear, which requires approximate linearization during the Kalman filtering.

An alternative of the nonlinear measurement equations is to convert the pseudo-spherical coordinates of the tracked target (i, j, R) into the 3D world coordinates (x, y, z) first. The 3D world coordinates of the tracked target (x, y, z) are then used as the measurements of the Kalman filter, which leads to a linear measurement equation. According to this consideration, the measurement equation is formulated as $$z(k)=Hx(k)+v(k)$$

where z(k) represents the 3D target position in the world coordinate frame at the k-th sampling time $t_k$, H is a measurement matrix, and v(k) is the measurement noise with a variance of R(k). It should be noted that the measurement matrix can be formulated by $$H = \begin{pmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \end{pmatrix}$$

We choose using the linear measurement equation, since it simplifies the Kalman filter formulation and reduces the computation load. The above discussion constitutes a complete model for the Kalman filter, which is used to improve the point tracking accuracy and to predict the search window for LDRI tracking.

To ensure the numerical stability and accuracy, a QR decomposition based factorized implementation of the Kalman filter has been applied for the step (4).

After step (4), coordinates of multi points of interest with respect to the LDRI world coordinate system are known, at least three points, are known and tracked. These relative position and velocity data can be output and input to the step (5) for determination of the attitude of the target.

Orientation determination is critical for 3D tracking. With the LDRI, the determination of the relative orientation, which is otherwise extremely difficult even with stereo cameras, can be readily accomplished. At least three points, whose coordinates with respect to the LDRI world coordinate system are known, have to be tracked in order to determine the relative orientation.

Orientation of a rigid body platform is determined by the orientation of the specified body frame coordinate system with respect to the reference coordinate system. In the 3D tracking application, the LDRI world coordinate system may be selected as the reference system, with the x-y plane in the lens plane and the z-axis pointing towards the outside. Such a reference coordinate system may not coincide with the body frame coordinate system, but has a fixed relationship with the latter. The orientation of the specified body frame coordinate system with respect to the reference coordinate system can thus be translated easily into orientation with respect to the body frame coordinate system.

Figure 5:
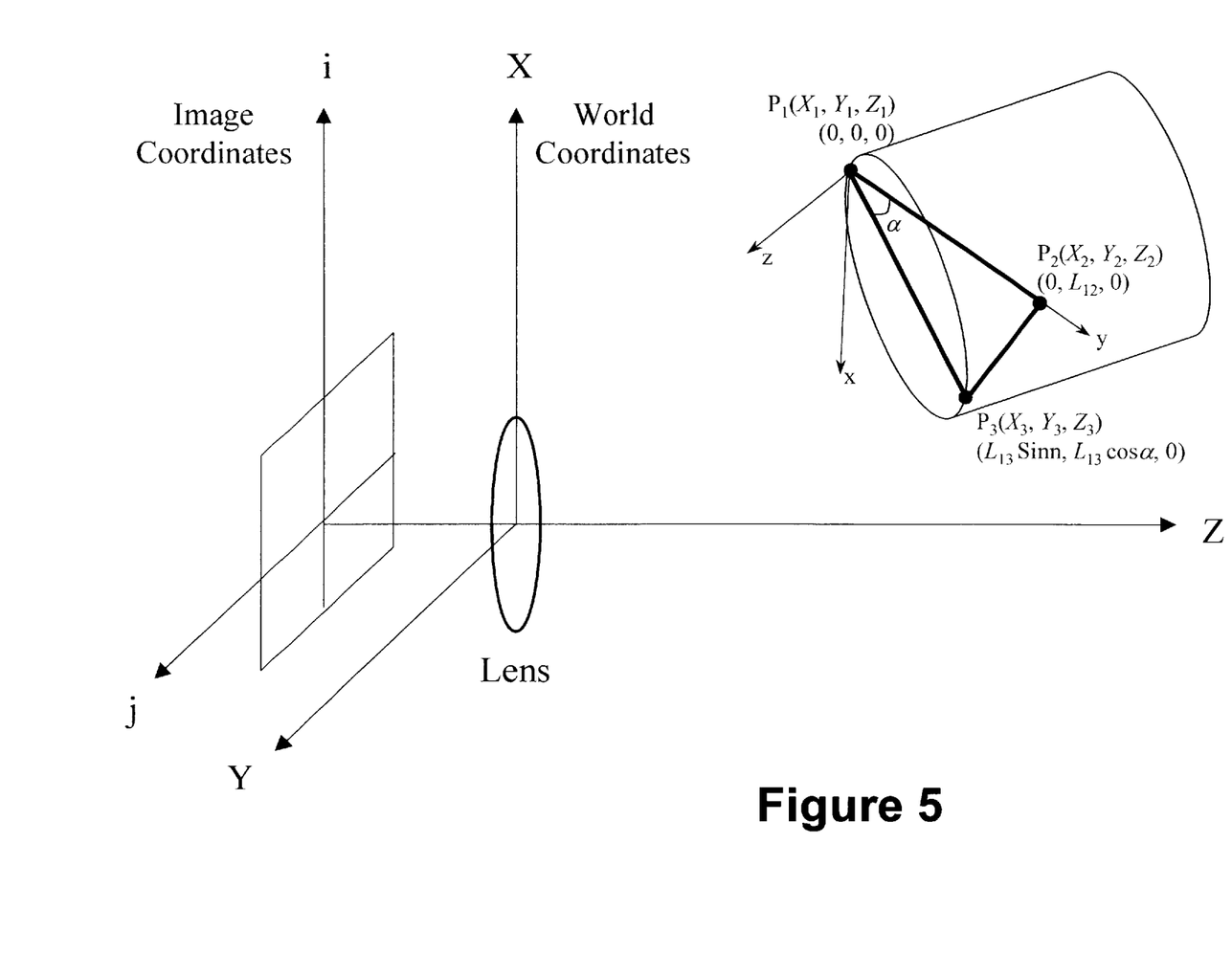
FIG. 5 shows the definition of the coordinate frames involved in relative orientation determination.

The body frame platform is determined by three points, referring to FIG. 5. Once the body platform is defined, a body frame coordinate system can be specified within the chosen platform. In the 3D tracking applications, assume that the three points form a plane. Select Point 1 as the origin of the body frame coordinate system and the line segment from Point 1 to Point 2 as the body frame y-axis. The body frame x-axis lies in the plane defined by the three points and pointing to the right of the y-axis. The body frame z-axis then completes the right-handed system. Since the distances among the points are known precisely, the points' coordinates in the body frame coordinate system can be calculated immediately. These body frame coordinates remain unchanged during all kinematic movements for a rigid body configuration.

The orientation of the body frame coordinate system with respect to the LDRI world coordinate system can be defined by a sequence of three (3) angles, Euler angles, and a prescription for rotating the reference coordinate frame through these angles to bring it into alignment with the body frame. A typical Euler rotation sequence starts from the reference frame and rotates in the following sequence:

1) Rotate about the z-axis with a yaw angle $\psi$.
2) Rotate about the x-axis with a roll angle $\phi$.
3) Rotate about the y-axis with a pitch angle $\theta$.

An applied direct computation method does not require knowledge of the points' body frame coordinates and only uses the reference coordinates of the three points that define the platform. Consider Point 2. The reference coordinates of Point 2 and its body coordinates are related by the transformation matrix. Solving the relationship equation for the baseline between Point 1 and Point 2 determines the yaw and roll angles of the body platform.

Consider Point 2 in FIG. 5. The reference coordinates of Point 2 are $x_{R2}=(X_2-X_1, Y_2-Y_1, Z_2-Z_1)^T$, and the body coordinates are $x_{B2}=(0, L_{12}, 0)^T$. They are related by transformation matrix as follows:

$$x_{R2}=T_{B/R}x_{B2}$$

which can be expanded into:

$$\begin{pmatrix} X_2-X_1 \\ Y_2-Y_1 \\ Z_2-Z_1 \end{pmatrix} = \begin{pmatrix} * & \cos\phi\sin\psi & * \\ * & \cos\phi\cos\psi & * \\ * & -\sin\phi & * \end{pmatrix}\begin{pmatrix} 0 \\ L_{12} \\ 0 \end{pmatrix} = \begin{pmatrix} \cos\phi\sin\psi L_{12} \\ \cos\phi\cos\psi L_{12} \\ -\sin\phi L_{12} \end{pmatrix}$$

where * means that the value of this element is not important. It can be easily shown that:

$$\tan\psi = \frac{X_2-X_1}{Y_2-Y_1}$$

$$\tan\phi = -\frac{Z_2-Z_1}{\sqrt{(X_2-X_1)^2+(Y_2-Y_1)^2}}$$

which leads to:

$$\psi = \arctan\frac{X_2-X_1}{Y_2-Y_1}$$

$$\phi = -\arctan\frac{Z_2-Z_1}{\sqrt{(X_2-X_1)^2+(Y_2-Y_1)^2}}$$

It can be seen from above that the baseline between Point 1 and Point 2 actually determines the yaw and roll angles of the body platform.

Once the yaw and roll angles are obtained, continue to consider Point 3 in FIG. 5. The reference coordinates of Point 3 are $x_{R3}=(X_3-X_1, Y_3-Y_1, Z_3-Z_1)^T$, and the body coordinates are $x_{B3}=(L_{13}\sin\alpha, L_{13}\cos\alpha, 0)^T$. They are related by the transformation matrix as follows:

$$x_{B3}=T_{R/B}x_{R3}$$

which can be expanded into:

$$\begin{pmatrix} L_{13}\sin\alpha \\ L_{13}\cos\alpha \\ 0 \end{pmatrix} =$$

$$\underbrace{\begin{pmatrix} \cos\theta & 0 & \sin\theta \\ 0 & 1 & 0 \\ -\sin\theta & 0 & \cos\theta \end{pmatrix}\begin{pmatrix} 1 & 0 & 0 \\ 0 & \cos\phi & -\sin\phi \\ 0 & \sin\phi & \cos\phi \end{pmatrix}\begin{pmatrix} \cos\psi & -\sin\psi & 0 \\ \sin\psi & \cos\psi & 0 \\ 0 & 0 & 1 \end{pmatrix}\begin{pmatrix} X_3-X_1 \\ Y_3-Y_1 \\ Z_3-Z_1 \end{pmatrix}}_{\text{Merge}}$$

Merging three items in the right-hand side of above together leads to:

$$\begin{pmatrix} L_{13}\sin\alpha \\ L_{13}\cos\alpha \\ 0 \end{pmatrix} = \begin{pmatrix} \cos\theta & 0 & \sin\theta \\ 0 & 1 & 0 \\ -\sin\theta & 0 & \cos\theta \end{pmatrix}\begin{pmatrix} X_{31} \\ Y_{31} \\ Z_{31} \end{pmatrix}$$

From the third row in the above equation, pitch angle can be computed as $$\theta = \arctan\frac{Z_{31}}{X_{31}}$$

For the direct computation for yaw, pitch, and roll angles, the only information used is the reference coordinates of the three points, calculated from the LDRI range and reflectance images.

The above description details the 3D relative positioning and tracking algorithms, which includes cross-plane correlation, subpixel tracking, focal length determination, Kalman filtering, and orientation determination, to take full advantage of the range and reflectance information provided by the LDRI. Besides these, the following are incorporated into the algorithms to further improve the algorithms and enhance the capability.

When the target is moving, the size and orientation of the pattern change accordingly. Therefore, the pattern should be updated during tracking, in order to keep track of the pattern. A few approaches for implementation of the step (6) are possible to update the pattern.

(6A) The approach is to use the pattern located in the latest frame as the pattern to be tracked in the current frame, regardless of the change of the shape, size, or orientation. This approach works pretty well when the target is moving very slowly with respect to the LDRI unit, such as the satellite docking application.

(6B) Another approach is more complicated. When tracking starts, either the user selects the patterns for objects of interest, or the patterns for objects of interest are loaded from a preset database. In either case, the feature patterns are only available for a predetermined view angle with a certain size. If the object is tilted or rotated at a different angle, or moves closer to or farther away from the camera, the feature patterns captured in the images look different. If the orientation and the distance of the object are known, the feature pattern can be remapped into a new one to accommodate the change of orientation and/or distance. Instead of searching the predetermined pattern, the new pattern can be used in the cross-plane correlation to improve the tracking accuracy and reduce the probability of miss. This approach requires the distance and orientation information.

Referring to FIG. 1, a three dimensional relative positioning and tracking system comprises:

a range image and reflectance image producer 1, including a LDRI, for generating the range images and reflectance images to a field of view for a target;

a cross-plane correlation module 21, for pinpointing points of interest in the image of the target with pixel accuracy;

a subpixel tracking module 22, for obtaining a subpixel resolution by means of numerical interpolation in a neighborhood of a pixel with a maximum correlation;

a focal length determination module 23 for determining the focal length;

a Kalman filter module 24, for computing the three-dimensional positions of the points of interest of the target; and a orientation determination module 26, for determining a relative attitude of the target between the target and a carrier of the LDRI.

When the target is moving, the size and orientation of the pattern change accordingly. Therefore, the pattern should be updated during tracking, in order to keep track of the pattern. A few approaches are possible to update the pattern.

Therefore, the three dimensional relative positioning and tracking system further comprises a pattern update module 27, for updating the pattern from the a cross-plane correlation module 21.

What is claimed is:

1. A three-dimensional relative positioning and tracking process, comprising:

(a) pinpointing points of interest in an image of a target with pixel accuracy;

(b) obtaining a subpixel resolution by means of numerical interpolation in a neighborhood of a pixel with a maximum correlation of said points of interest;

(c) determining a focal length of lens of a range image and reflectance image producer;

(d) computing 3-dimensional positions of said points of interest of said target with respect to a carrier of the range image and reflectance image producer; and (e) determining a relative attitude of said target with respect to said carrier from three selected 3-dimensional positions of said 3-dimensional positions of said target.

2. A three-dimensional relative positioning and tracking process, as recited in claim 1, wherein said range image and reflectance image producer is a laser dynamic range imager (LDRI).

3. A three-dimensional relative positioning and tracking process, as recited in claim 2, after said step (e), further comprising an additional step of:

(f) updating said points of interest in the step (a) by using said 3-dimensional positions obtained in the step (d) and said relative attitude of the target obtained in the step (e).

4. A three-dimensional relative positioning and tracking process, as recited in claim 2, wherein the step (a) further comprises the steps of:

(a.1) defining a pattern to be tracked;

(a.2) selecting a search window containing said pattern;

(a.3) passing said pattern over said search window and computing a cross-correlation; and (a.4) determining said 3-dimensional position of said points of interest of said search window that match with said pattern when said cross-correlation takes a highest value thereof at a pixel position.

5. A three-dimensional relative positioning and tracking process, as recited in claim 3, wherein the step (a) further comprises the steps of:

(a.1) defining a pattern to be tracked;

(a.2) selecting a search window containing said pattern;

(a.3) passing said pattern over said search window and computing a cross-correlation; and (a.4) determining said 3-dimensional position of said points of interest of said search window that match with said pattern when said cross-correlation takes a highest value thereof at a pixel position.

6. A three-dimensional relative positioning and tracking process, as recited in claim 4 wherein the step (a.1) is performed through a database of specific patterns, wherein said database of specific patterns extracted from said target is selected for pattern recognition and selection.

7. A three-dimensional relative positioning and tracking process, as recited in claim 5, wherein the step (a.1) is performed through a database of specific patterns, wherein said database of specific patterns extracted from said target is selected for pattern recognition and selection.

8. A three-dimensional relative positioning and tracking process, as recited in claim 7, wherein the step (d) constructs and performs a Kalman filtering for approaching said three-dimensional positions of said target.

9. A three-dimensional relative positioning and tracking process, as recited in claim 7, wherein the step (e) using a direct computation method which does not require knowledge of body frame coordinates of said three selected 3-dimensional positions and only uses reference coordinates of said three selected 3-dimensional positions that define said target, wherein said direct computation method includes the steps of:

considering a first position and a second position of said three selected 3-dimensional positions, said reference coordinates of said second position while said body coordinates thereof are related by a transformation matrix, solving a relationship equation for a baseline between said first position and said second position to determine yaw and roll angles of said target, and considering a third position of said three selected 3-dimensional positions to compute a pitch angle from said yaw and roll angles.

10. A three-dimensional relative positioning and tracking process, as recited in claim 7, wherein the step (b) performs a cubic spline interpolation function method for obtaining subpixel resolution.

11. A three-dimensional relative positioning and tracking process, as recited in claim 10, wherein the step (d) constructs and performs a Kalman filtering for approaching said three-dimensional positions of said target.

12. A three-dimensional relative positioning and tracking process, as recited in claim 10, wherein the step (e) using a direct computation method which does not require knowledge of body frame coordinates of said three selected 3-dimensional positions and only uses reference coordinates of said three selected 3-dimensional positions that define said target, wherein said direct computation method includes the steps of:

considering a first position and a second position of said three selected 3-dimensional positions, said reference coordinates of said second position while said body coordinates thereof are related by a transformation matrix, solving a relationship equation for a baseline between said first position and said second position to determine yaw and roll angles of said target, and considering a third position of said three selected 3-dimensional positions to compute a pitch angle from said yaw and roll angles.

13. A three-dimensional relative positioning and tracking process, as recited in claim 11, wherein the step (e) using a direct computation method which does not require knowledge of body frame coordinates of said three selected 3-dimensional positions and only uses reference coordinates of said three selected 3-dimensional positions that define said target, wherein said direct computation method includes the steps of:

considering a first position and a second position of said three selected 3-dimensional positions, said reference coordinates of said second position while said body coordinates thereof are related by a transformation matrix, solving a relationship equation for a baseline between said first position and said second position to determine yaw and roll angles of said target, and considering a third position of said three selected 3-dimensional positions to compute a pitch angle from said yaw and roll angles.

14. A three-dimensional relative positioning and tracking process, as recited in claim 1, after said step (e), further comprising an additional step of:

(f) updating said points of interest in the step (a) by using said 3-dimensional positions obtained in the step (d) and said relative attitude of the target obtained in the step (e).

15. A three-dimensional relative positioning and tracking process, as recited in claim 14, wherein the step (a) further comprises the steps of:

(a.1) defining a pattern to be tracked;

(a.2) selecting a search window containing said pattern;

(a.3) passing said pattern over said search window and computing a cross-correlation; and (a.4) determining said 3-dimensional position of said points of interest of said search window that match with said pattern when said cross-correlation takes a highest value thereof at a pixel position.

16. A three-dimensional relative positioning and tracking process, as recited in claim 15, wherein the step (a.1) is performed through a database of specific patterns, wherein said database of specific patterns extracted from said target is selected for pattern recognition and selection.

17. A three-dimensional relative positioning and tracking process, as recited in claim 1, wherein the step (a) further comprises the steps of:

(a.1) defining a pattern to be tracked;

(a.2) selecting a search window containing said pattern;

(a.3) passing said pattern over said search window and computing a cross-correlation; and (a.4) determining said 3-dimensional position of said points of interest of said search window that match with said pattern when said cross-correlation takes a highest value thereof at a pixel position.

18. A three-dimensional relative positioning and tracking process, as recited in claim 17, wherein the step (a.1) is performed through a database of specific patterns, wherein said database of specific patterns extracted from said target is selected for pattern recognition and selection.

19. A three-dimensional relative positioning and tracking process, as recited in claim 1, wherein the step (b) performs a cubic spline interpolation function method for obtaining subpixel resolution.

20. A three-dimensional relative positioning and tracking process, as recited in claim 1, wherein the step (d) constructs and performs a Kalman filtering for approaching said three-dimensional positions of said target.

21. A three-dimensional relative positioning and tracking process, as recited in claim 1, wherein the step (e) using a direct computation method which does not require knowledge of body frame coordinates of said three selected 3-dimensional positions and only uses reference coordinates of said three selected 3-dimensional positions that define said target, wherein said direct computation method includes the steps of:

considering a first position and a second position of said three selected 3-dimensional positions, said reference coordinates of said second position while said body coordinates thereof are related by a transformation matrix, solving a relationship equation for a baseline between said first position and said second position to determine yaw and roll angles of said target, and considering a third position of said three selected 3-dimensional positions to compute a pitch angle from said yaw and roll angles.

22. A three dimensional relative positioning and tracking system, comprising:

a range image and reflectance image producer, which is contained in a carrier, generating range images and reflectance images for a target;

a cross-plane correlation module for pinpointing points of interest in said range images and said reflectance images of said target with pixel accuracy;

a subpixel tracking module for obtaining a subpixel resolution by means of numerical interpolation in a neighborhood of a pixel with a maximum correlation of said points of interest;

a focal length determination module for determining a focal length of lens of a said range image and reflectance image producer;

a Kalman filter module for computing 3-dimensional positions of said points of interest of said target with respect to said carrier; and a orientation determination module for determining a relative attitude of said target with respect to said carrier from three selected 3-dimensional positions of said 3-dimensional positions of said target.

23. A three dimensional relative positioning and tracking system, as recited in claim 22, wherein said range image and reflectance image producer is a Laser Dynamic Range Imager (LDRI).

24. A three dimensional relative positioning and tracking system, as recited in claim 22, further comprising a pattern update module for updating said points of interest from by using said 3-dimensional positions and said relative attitude of said target.

25. A three dimensional relative positioning and tracking system, as recited in claim 23, further comprising a pattern update module for updating said points of interest from by using said 3-dimensional positions and said relative attitude of said target.

26. A three-dimensional relative positioning and tracking system, as recited in claim 25, wherein said LDRI defines a pattern to be tracked, selects a search window containing said pattern, passes said pattern over said search window and computing a cross-correlation, and determines said 3-dimensional position of said points of interest of said search window that match with said pattern when said cross-correlation takes a highest value thereof at a pixel position.

* * * * *